United States Patent [19]

Cordes et al.

[11] 4,031,065

[45] June 21, 1977

[54] MANUFACTURE OF THERMOPLASTIC POLYESTER MOLDING COMPOSITIONS OF HIGH VISCOSITY

[75] Inventors: Claus Cordes, Weisenheim; Hans-Josef Sterzel, Dannstadt-Schauernheim, both of Germany

[73] Assignee: BASF Aktiengesellschaft, Ludwigshafen (Rhine), Germany

[22] Filed: Feb. 23, 1976

[21] Appl. No.: 660,137

[30] Foreign Application Priority Data

Mar. 6, 1975 Germany .......................... 2509790
Nov. 22, 1975 Germany .......................... 2552424

[52] U.S. Cl. ........................... 260/75 R; 260/75 M
[51] Int. Cl.$^2$ ....................................... C08G 63/52
[58] Field of Search ............... 260/75 R, 75 M, 861

[56] References Cited

UNITED STATES PATENTS 3,940,367  2/1976  Pelousek et al. ........... 260/45.95 R

*Primary Examiner*—Lucille M. Phynes
*Attorney, Agent, or Firm*—Keil, Thompson & Shurtleff

[57] ABSTRACT

Thermoplastic polyesters having a melt viscosity of more than 6,000 poise, as measured at 250° C, and a relative solution viscosity of more than 1.6, as measured on a 2:1 mixture of phenol/o-dichlorobenzene at 25° C, composed of aliphatic and/or cycloaliphatic diols on the one hand and dicarboxylic acids or esters thereof on the other hand and of from 0.1 to 10% molar of an aliphatic diol containing at least one olefinic double bond and/or of an aliphatic dicarboxylic acid containing at least one olefinic double bond or an ester thereof, said olefinic double bond not being directly adjacent to the carboxyl or ester groups. The polyesters are manufactured by melt polycondensation of diols with dicarboxylic acids or esters thereof, which polycondensation is carried out for at least some of the time at a temperature above 220° C and preferably above 230° C, the reaction being carried out in the presence of from 0.1 to 10% molar of an aliphatic diol containing at least one olefinic double bond and/or of an aliphatic dicarboxylic acid containing at least one olefinic double bond or an ester thereof, said olefinic double bond not being directly adjacent to the carboxyl or ester groups.

10 Claims, No Drawings

MANUFACTURE OF THERMOPLASTIC POLYESTER MOLDING COMPOSITIONS OF HIGH VISCOSITY

The present invention relates to a process for the manufacture of thermoplastic polyesters of high melt viscosity.

Thermoplastic olyesters such as polyethylene terephthalate and poly(1,4-butylene terephthalate) are well known as film-forming and fiber-forming materials. They are usually prepared by transesterification of dimethyl terephthalate with an excess of the appropriate diol and in the presence of a suitable catalyst at atmospheric pressure. Following transesterification, the excess diol is distilled off under reduced pressure, this causing polycondensation of the low molecular weight terephthalate obtained in the first stage. However, the preparation of products having higher relative viscosities than 1.6, as measured on a 0.5% solution, by this process is extremely difficult or impossible. Polymers having a maximum melt viscosities are particularly required for the extrusion of films, ropes and sections and also, for example, for blow molding.

It has therefore been recommended, in UK Pat. No. 1,066,162 and U.S. Pat. No. 3,405,098, to increase the viscosity of the polyester compositions by subjecting the granular polymers to post-condensation in the solid phase at elevated temperatures with or without the use of vacuum or inert gases. These processes are expensive, however, and involve undesirable but unavoidable changes in the properties of the products, for example their color and crystallinity. German published application No. 1,900,270 discloses, moreover, a method of increasing the melt viscosity of linear thermoplastic polyesters by adding trifunctional or polyfunctional alcohols or carboxylic acids or carboxylates in small amounts to the molten condensation mixture. However, cocondensation of crosslinked polyfunctional alcohols or carboxylic acids or esters thereof has the drawback that is is very difficult to adjust the viscosity to the specific value desired. Excessive cross-linking is particularly dangerous, since this can result in serious breakdowns and may be detrimental to the quality of the polyester due to the formation of fish-eyes.

We have now found, surprisingly, that high-viscosity polyesters may be very simply produced by polycondensation in the melt if the polycondensation is carried out in the presence of from 0.1 to 10% molar of an aliphatic diol containing at least one olefinic double bond at a temperature above 220° C and preferably above 230° C. In place of said aliphatic diol use may be made of aliphatic dicarboxylic acids containing olefinic double bonds or esters thereof, provided the olefinic double bond is not directly adjacent to the carboxyl or ester groups.

The process of the invention is suitable for the manufacture of high molecular weight polyester molding compositions based, for example, on butanediol-1,4, ethylene glycol, propylene glycol-1,2, hexanediol-1,6 1,4-dimethylolcyclohexane and terephthalic acid, isophthalic acid, phthalic acid, adipic acid and esters thereof. The preferred ester is the dimethyl ester. In addition to the pure diols and dicarboxylic acids or esters, use may be made of mixtures of a number of diols or dicarboxylic acids or esters thereof. The starting materials are polycondensed in the molten phase. The process usually involves transesterification of the dicarboxylic ester with the diol, advantageously present in molar excess, in a first stage, preferably at atmospheric pressure. Catalysts may be used if desired. Where dicarboxylic acids are used, the first stage involves transesterification between dicarboxylic acids and diols. It may be advantgeous, in some cases, to use superatmospheric pressure. Polycondensation usually takes place in a second stage immediately following the first stage, the excess diol being distilled off. The reaction may be accelerated by the use of conventional catalysts. In the final phase of the process, in particular, low pressures are used, for example pressures of less than 2 mm of Hg. According to the invention, from 0.1 to 10% molar and preferably from 0.5 to 5% molar of an aliphatic diol having at least one olefinic double bond is added under these conventional conditions. In a particularly preferred embodiment use is made of butene-2-diol-1,4. In another preferred embodiment, the invention makes use of butene-2-diol-1,4 for the manufacture of polybutylene terephthalate molding compositions. Furthermore, according to the invention, aliphatic dicarboxylic acids or esters thereof may be used in amounts of from 0.1 to 10% molar and preferably from 0.5 to 5% molar in place of or in addition to the olefinically unsaturated diols, which aliphatic dicarboxylic acids or esters thereof contain at least one olefinic double bond which is not directly adjacent to the carboxyl or ester groups. A suitable dicarboxylic acid for use in the present invention is, for example, hexene-2-dicarboxylic acid.

In accordance with the invention, the olefinically unsaturated diols, dicarboxylic acids or esters are introduced prior to the post-condensation or, if desired, together with the starting materials. After the addition of the olefinically unsaturated components proposed in the present invention, the polycondensation is carried out, in accordance with the invention, at a temperature above 220° C and preferably one above 230° C, the upper temperature limit generally being not above 280° C. According to the invention, it is not necessary for the temperature to be 220° C or more throughout polycondensation. For example, polycondensation may be mainly carried out below 220° C, the temperature being raised to above 220° C and preferably above 230° C during the final phase of the reaction. In a preferred embodiment, the temperature is held at a value above 230° C for at least 20 minutes. In particular, the desired final viscosity of the product is achieved by the controlling the temperature and the residence time at said temperature. For a given recipe, the melt viscosity is raised by raising the temperature and increasing the residence times. According to the invention, polycondensation is carried out in the molten phase until a relative viscosity of more than 1.6 and peferably more than 1.75 is obtained. The relative viscosity is measured on a 0.5% solution of the polymer in a 3:2 mixture of phenol/o-dichlorobenzene at 25° C in a capillary viscosimeter.

The process of the invention makes it possible to produce thermoplastic polyester molding compositons of high viscosity in a simple manner exclusively by polycondensation in the melt. In particular, the process of the invention makes it possible to achieve, simply and reliably, specific melt viscosities required for specific purposes. The products manufactured by the process of the invention are distinguished by their pale color, good processing stability and excellent mechanical properties. They are particularly suitable for the manufacture of thick-walled, heavy-duty injection moldings and, on account of their high melt viscosity, for the production of high-quality sheeting, for the extrusion of ropes and sections and for blow molding. Further details are given in the Examples below.

According to a special embodiment of the invention, polycondensation is additionally carried out in the presence of organic compounds which dissociate at elevated temperature to give free radicals.

Suitable compounds for carrying out this embodiment of the process of the invention are thermally unstable compounds which form free radicals at temperatures of from 230° to 280° C with a half-life of less than 2 hours. By half-life we mean the time taken for dissociation of the thermally unstable compound to reduce its weight by 50%. Suitable compounds for the purposes of the invention include the following:

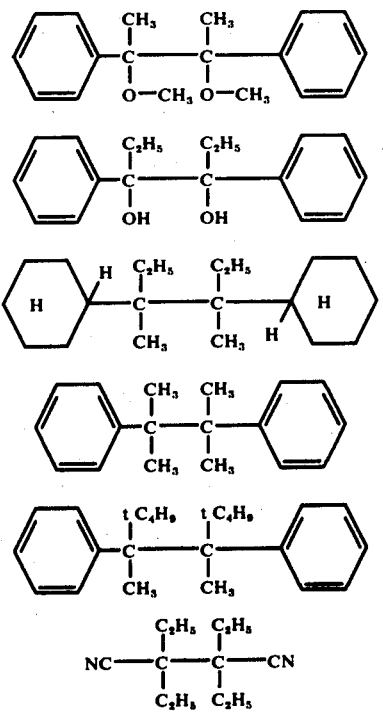

We prefer to use the polyrecombination product of diisopropylbenzene obtained by reacting a diisopropylbenzene with catalytic amounts of a peroxide at elevated temperatures.

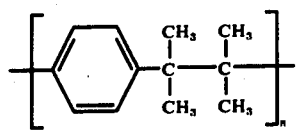

The synthesis of this polymer is described, for example, in J. Polym. Soc. 52, 213 (1961).

The said thermally unstable compounds are added to the polycondensation mixture in concentration of from 0.001 to 2% and preferably from 0.05 to 0.2%, by weight of the total weights of dicarboxylic acids and/or their esters. The addition may be made at any stage of the polycondensation, for example before or during transesterification or esterification or during polycondensation of the low molecular weight polyester to form high molecular weight polyester at temperatures above 230° C and under reduced pressure.

We prefer to add them to the low molecular weight polyester before this is condensed under reduced pressure to high molecular weight polyester.

EXAMPLES 1 TO 11

The following ingredients are placed cold in a reaction vessel of stainless steel which is provided with a heating jacket, through which a mixture of diphenyl and diphenyl oxide is passed for heating purposes, and which is also provided with a stirrer, a vacuum connection and the usual control means:

butanediol-1,4 (I)
butene-2-diol-1,4 (II)
3-methyl-2-pentene-1,5-diol (III)
3-methylene-pentane-1,5-diol (IV) or
hexene-3-dioic acid (V)
tetrabutyl orthotitanate (VII)
dimethyl terephthalate (VI)

The amounts used are listed in the Table below. Transesterification begins at about 130°–140° C. The temperature is raised over 2 hours to 220° C, during which period the theoretical amount of methanol distills off. The pressue is then progressively reduced to 0.5 mm of Hg over 1.5 hours and the temperature is raised to the final condensation temperature. Condensation is then continued at this temperature until the desired final viscosity has been reached.

Measurement of the melt viscosity is effected at 250° C using a capillary viscosimeter KV 100 with a nozzle 1 mm in diameter and 10 mm long. Measurements were effected at various shear gradients and the melt viscosity then extrapolated to shear gradient 0.

As may be seen from the Examples, a higher degree of condensation is achieved by raising the reaction temerature. The viscosity may be controlled to give the desired final value simply by adjusting the final condensation temperature.

TABLE

| Example | 1 | 2 | 3 | 4 | 5 | 6 | 7 | 8 | 9 | 10 | 11 |
|---|---|---|---|---|---|---|---|---|---|---|---|
| Ingredients: | | | | | | | | | | | |
| VI | 12000 g | as 1 | as 1 | as 1 | as 1 | as 1 | as 1 | as 1 | as 1 | as 1 | as 1 |
| (moles) | (62) | | | | | | | | | | |
| I | 8300 g | 8180 g | 7930 g | 7550 g | as 1 | as 2 | as 3 | 8330 g | as 1 | as 1 | as 1 |
| (moles) | (92) | (91) | (99) | (84) | | | | (93) | | | |
| II | 41 g | 163 g | 408 g | 820 g | as 1 | as 2 | as 3 | — | — | — | — |
| (moles) | (0.47) | (1.85) | (4.6) | (9.3) | | | | | | | |
| III | — | — | — | — | — | — | — | — | 55 g | — | — |
| (moles) | | | | | | | | | (0.46) | | |
| IV | — | — | — | — | — | — | — | — | — | 55 g | — |
| (moles) | | | | | | | | | | (0.46) | |
| V | — | — | — | — | — | — | — | — | — | — | 45 g |

TABLE-continued

| Example | 1 | 2 | 3 | 4 | 5 | 6 | 7 | 8 | 9 | 10 | 11 |
|---|---|---|---|---|---|---|---|---|---|---|---|
| (moles) | | | | | | | | | | | (0.31) |
| VII (moles) | 18 g (0.15) | as 1 | as 1 | as 1 | as 1 | as 1 | as 1 | as 1 | as 1 | as 1 | as 1 |
| final condensation temperature in °C | 245 | 245 | 245 | 245 | 260 | 260 | 260 | 245 | 245 | 245 | 245 |
| condensation time at final temperature in hours | 1.4 | 1.42 | 1.3 | 1.4 | 1.1 | 1.0 | 0.95 | 1.5 | 1.35 | 1.22 | 1.4 |
| relative viscosity | 1.80 | 1.90 | 1.92 | 1.92 | 1.95 | 1.94 | 2.01 | 1.62 | 1.82 | 1.87 | 1.90 |
| melt viscosity [poise] | 13600 | 18400 | 19400 | 19600 | 22000 | 21200 | 26000 | 4500 | 13800 | 16000 | 18600 |

EXAMPLES 12, 13 AND 14

The following ingredients are placed cold in a reaction vessel of stainless steel which is provided with a jacket through which a mixture of diphenyl and diphenyl oxide is passed for heating purposes and which is also provided with a stirrer, a vacuum connection and the usual control means:

12,000 g of dimethyl terephthalate
5,470 g of ethylene glycol
and additionally in Examples 13 and 14
410 g of butene-2-diol-1,4.

The mixture is melted at a temperature of 130° C, and to the resulting melt there are added 1.2 g of manganese acetate
3.6 g of zinc acetate and
6.0 g of antimony trioxide.

The transesterification reaction commences at about 140° C. The temperature is then raised to 220° C over about 2 hours, during which period 3,960 g of methanol distill off. The temperature is then raised to 250° C, and 6 g of triphenyl phosphite and, in Example 14, the amount of polyrecombination product of diisopropylbenzene listed in the Table below are added. The pressure is then grandually reduced to 0.5 mm of Hg in a programmed manner over 1.5 hours, and the temperature is raised from 250° C to 280° C over the same period. Condensation is then continued for a further 2 hours at this temperature and the molten polyester is then discharged from the reaction vessel under pressure. All reaction conditions are identical in Examples 12 to 14. $\nu_{rel}$ is the relative viscosity of a 0.5% solution of the polyester in a 3:2 mixture of phenol and O-dichlorobenzene at 25° C. $\nu_{280}$ designates the melt viscosity at 280° C.

| Ex. | Butene-2-diol-1,4 added | % molar of butene-2-diol-1,4 | Polyrecombination product of diisopropylbenzene added | $\eta_{rel}$ | $\eta_{280}$ [d Pas] |
|---|---|---|---|---|---|
| 12 | — | 0 | — | 1.37 | 2,400 |
| 13 | 410 g | 5 | — | 1.45 | 5,500 |
| 14 | 410 g | 5 | 6 g | 1.52 | 8,500 |

As may be seen from the above Examples, the viscosity of the polyester is markedly increased by the addition of a thermally unstable free-radical compound to the polycondensation mixture after transesterification.

We claim:

1. A process for the manufacture of thermoplastic polyesters having a melt viscosity of more than 6,000 poise, as measured at 250° C, and having a relative viscosity of more than 1.6, as measured in a 2:1 mixture of phenol and o-dichlorobenzene at 25° C, by polycondensation, in the melt, of aliphatic and/or cycloaliphatic diols with dicarboxylic acids and/or esters thereof, wherein the polycondensation is effected for at least some of the time at a temperature above 220° C and preferably above 230° C, and in the presence of from 0.1 to 10% molar of an aliphatic diol containing at least one olefinic double bond and/or of an aliphatic dicarboxylic acid containing at least one olefinic double bond or an ester thereof, the olefinic double bond not being directly adjacent to the carboxyl or ester groups.

2. A process as claimed in claim 1, wherein the unsaturated diol is used butene-2-diol-1,4.

3. A process for the manufacture of thermoplastic poly(1,4-butylene terephthalate) molding compositions as claimed in claim 1.

4. A process as claimed in claim 1, wherein the temperature is raised to values above 220° C and preferably above 230° C only in the final phase of the reaction.

5. A process as claimed in claim 1, wherein the temperature is maintained at a value above 230° C for at least 20 minutes.

6. A process as claimed in claim 1, wherein the polycondensation is carried out in the presence of from 0.001 to 2.0% and preferably from 0.5 to 0.2% by weight, based on the total amount of dicarboxylic acid or esters thereof, of a thermally unstable free-radical compound.

7. A process as claimed in claim 6, wherein the thermally unstable compound is one which dissociates to free radicals at temperatures of from 230° to 280° C with a half-life of less than 2 hours.

8. A process as claimed in claim 6, wherein the monomers used are mainly ethylene glycol and dimethyl terephthalate or terephthalic acid and polycondensation is carried to relative viscosities of more than 1.45, as measured on a 0.5% solution in a 3:2 mixture of phenol and o-dichlorobenzene at 25° C.

9. A process as claimed in claim 6, wherein the thermally unstable compound used is the polyrecombination product of diisopropylbenzene.

10. Thermoplastic polyesters having a melt viscosity of more than 6,000 poise, as measured at 250° C, and a relative viscosity of more than 1.6, as measured on a 2:1 mixture of phenol and o-dichlorobenzene at 25° C, consisting of aliphatic and/or cycloaliphatic diols on the one hand and dicarboxylic acids or esters thereof on the other hand and from 0.1 to 10% molar of an aliphatic diol containing at least one olefinic double bond and/or of an aliphatic dicarboxylic acid containing at least one olefinic double bond or an ester thereof, the olefinic double bond not being directly adjacent to the carboxyl or ester groups.

* * * * *

UNITED STATES PATENT AND TRADEMARK OFFICE
CERTIFICATE OF CORRECTION

PATENT NO. : 4,031,065
DATED : June 21, 1977
INVENTOR(S) : Claus Cordes et al

It is certified that error appears in the above-identified patent and that said Letters Patent are hereby corrected as shown below:

Column 6, line 26, "is used" should read --used is--.

Column 6, line 39, "0.5" should read --0.05--.

Column 6, line 44, after "compound" insert --used--.

Signed and Sealed this

Eleventh Day of April 1978

[SEAL]

Attest:

RUTH C. MASON
Attesting Officer

LUTRELLE F. PARKER
Acting Commissioner of Patents and Trademarks